United States Patent
Deng et al.

(10) Patent No.: US 11,076,280 B2
(45) Date of Patent: Jul. 27, 2021

(54) USER EQUIPMENT, SERVING BASE STATION, AND METHODS OF USER EQUIPMENT AND SERVING BASE STATION

(71) Applicant: Alcatel Lucent, Nozay (FR)

(72) Inventors: Yun Deng, Shanghai (CN); Yong Liu, Shanghai (CN); Dong Li, Shanghai (CN)

(73) Assignee: Alcatel Lucent, Nozay (FR)

( * ) Notice: Subject to any disclaimer, the term of this patent is extended or adjusted under 35 U.S.C. 154(b) by 381 days.

(21) Appl. No.: 15/777,014

(22) PCT Filed: Nov. 16, 2016

(86) PCT No.: PCT/IB2016/001775
§ 371 (c)(1),
(2) Date: May 17, 2018

(87) PCT Pub. No.: WO2017/085556
PCT Pub. Date: May 26, 2017

(65) Prior Publication Data
US 2020/0296567 A1 Sep. 17, 2020

(30) Foreign Application Priority Data
Nov. 20, 2015 (CN) .......................... 201510810878.6

(51) Int. Cl.
*H04L 5/00* (2006.01)
*H04W 4/50* (2018.01)
(Continued)

(52) U.S. Cl.
CPC ............ *H04W 8/005* (2013.01); *H04L 5/0032* (2013.01); *H04L 5/0094* (2013.01); *H04W 4/50* (2018.02);
(Continued)

(58) Field of Classification Search
CPC ............. H04W 4/30–90; H04W 8/005; H04W 8/18–245; H04W 16/02–16;
(Continued)

(56) References Cited

U.S. PATENT DOCUMENTS

2012/0163235 A1* 6/2012 Ho .................... H04W 76/14
2014/0211696 A1 7/2014 Chai et al.
(Continued)

FOREIGN PATENT DOCUMENTS

| CN | 103037448 A | 4/2013 |
|----|-------------|--------|
| CN | 103380654 A | 10/2013 |

OTHER PUBLICATIONS

Intel Corporation, "D2D Discovery Support in the Presence of Multiple Carriers and PLMNs," 3rd Generation Partnership Project (3GPP), 3GPP TSG RAN WG1 Meeting #80bis, R1-151441, pp. 1-6, XP050934316, Belgrade, Serbia, Apr. 20-24, 2015. (Year: 2015).*

(Continued)

*Primary Examiner* — Timothy J Weidner
(74) *Attorney, Agent, or Firm* — Fay Sharpe LLP

(57) ABSTRACT

Embodiments of the present disclosure provide a method of user equipment which performs cellular transmission via a serving base station. The method may comprise: sending a request message to the serving base station to request allocation of a resource for device-to-device (D2D) discovery transmission; receiving from the serving base station an indication message for indicating the allocated resource; and performing the D2D discovery transmission on the allocated resource while the cellular transmission is performed. The embodiments of the present disclosure further provide a method of a serving base station, user equipment, and a serving base station.

13 Claims, 7 Drawing Sheets

(51) Int. Cl.

| | |
|---|---|
| *H04W 4/70* | (2018.01) |
| *H04W 4/80* | (2018.01) |
| *H04W 8/00* | (2009.01) |
| *H04W 8/24* | (2009.01) |
| *H04W 16/10* | (2009.01) |
| *H04W 16/14* | (2009.01) |
| *H04W 24/02* | (2009.01) |
| *H04W 24/10* | (2009.01) |
| *H04W 36/00* | (2009.01) |
| *H04W 36/14* | (2009.01) |
| *H04W 40/12* | (2009.01) |
| *H04W 40/24* | (2009.01) |
| *H04W 48/10* | (2009.01) |
| *H04W 48/18* | (2009.01) |
| *H04W 52/38* | (2009.01) |
| *H04W 52/42* | (2009.01) |
| *H04W 72/04* | (2009.01) |
| *H04W 72/10* | (2009.01) |
| *H04W 76/11* | (2018.01) |
| *H04W 76/14* | (2018.01) |
| *H04W 84/04* | (2009.01) |
| *H04W 84/22* | (2009.01) |
| *H04W 88/06* | (2009.01) |
| *H04W 88/10* | (2009.01) |
| *H04W 92/02* | (2009.01) |
| *H04W 92/10* | (2009.01) |
| *H04W 92/18* | (2009.01) |
| *H04W 92/20* | (2009.01) |

(52) U.S. Cl.
CPC ............... *H04W 4/70* (2018.02); *H04W 4/80* (2018.02); *H04W 8/245* (2013.01); *H04W 16/10* (2013.01); *H04W 16/14* (2013.01); *H04W 24/02* (2013.01); *H04W 24/10* (2013.01); *H04W 36/0069* (2018.08); *H04W 36/14* (2013.01); *H04W 40/12* (2013.01); *H04W 40/246* (2013.01); *H04W 48/10* (2013.01); *H04W 48/18* (2013.01); *H04W 52/383* (2013.01); *H04W 52/386* (2013.01); *H04W 52/42* (2013.01); *H04W 72/042* (2013.01); *H04W 72/0406* (2013.01); *H04W 72/0413* (2013.01); *H04W 72/0426* (2013.01); *H04W 72/0453* (2013.01); *H04W 72/0473* (2013.01); *H04W 72/10* (2013.01); *H04W 76/11* (2018.02); *H04W 76/14* (2018.02); *H04W 84/042* (2013.01); *H04W 84/22* (2013.01); *H04W 88/06* (2013.01); *H04W 88/10* (2013.01); *H04W 92/02* (2013.01); *H04W 92/10* (2013.01); *H04W 92/18* (2013.01); *H04W 92/20* (2013.01)

(58) Field of Classification Search
CPC ..... H04W 24/02–10; H04W 28/02–26; H04W 36/0005–385; H04W 40/24–38; H04W 48/02–20; H04W 52/04–60; H04W 56/001–0025; H04W 72/005–14; H04W 74/002–0891; H04W 76/10–50; H04W 84/005–22; H04W 88/005; H04W 88/02; H04W 88/04–18; H04W 92/02–24; H04L 5/003–0098

See application file for complete search history.

(56) References Cited

U.S. PATENT DOCUMENTS

| | | |
|---|---|---|
| 2015/0312960 A1 | 10/2015 | Kim et al. |
| 2016/0021483 A1* | 1/2016 | Wei .......... H04W 4/70 |
| 2018/0035279 A1* | 2/2018 | Fujishiro .......... H04W 72/0406 |

OTHER PUBLICATIONS

Samsug, "Inter Carrier Discovery," 3GPP TSG-RAN WG2 #91 R2-153091, Aug. 28, 2015, Internet<URL:http://www.3gpp.org/ftp/tsgran/WG2_RL2/TSGR2_91/Docs/R2-153091. (Year: 2015).*

3$^{rd}$ Generation Partnership Project; Technical Specification Group Radio Access Network; Evolved Universal Terrestrial Radio Access (E-UTRA); User Equipment (UE) procedures in idle mode (Release 14), 3GPP TS 36.304 V14.6.0, pp. 1-50, (Mar. 2018).

Intel Corporation, "D2D Discovery Support in the Presence of Multiple Carriers and PLMNs," 3$^{rd}$ Generation Partnership Project (3GPP), 3GPP TSG RAN WG1 Meeting #80bis, R1-151441, pp. 1-6, XP050934316, Belgrade, Serbia, Apr. 20-24, 2015.

Intel Corporation, "ProSe discovery for inter-carrier and inter-PLMN," 3$^{rd}$ Generation Partnership Project (3GPP), 3GPP TSG-RAN WG2 #89bis, R2-151115, pp. 1-3, XP050936096, Bratislava, Slovakia, Apr. 20-24, 2015.

Chia-Hao Yu et al., "Resource Sharing Optimization for Device-to-Device Communication Underlaying Cellular Networks," IEEE Transactions on Wireless Communications, vol. 10, No. 8, pp. 2752-2763, XP011390165, Aug. 2011.

International Search Report for PCT/IB2016/001775 dated Jun. 27, 2017.

Samsung, "Inter Carrier Discovery," 3GPP TSG-RAN WG2 #91 R2-153091, Aug. 28, 2015, Internet<URL:http://www.3gpp.org/ftp/tsg_ran/WG2_RL2/TSGR2_91/Docs/R2-153091.

Qualcomm Incorporated, "Inter Frequency and Inter PLMN Discovery," 3GPP TSG-RAN WG2 #91bis R2-154757, Oct. 9, 2015, Internet<URL:http://www.3gpp.org/ftp/tsg_ran/WG2_RL2/TSGR2_91bis/Docs/R2-154757.

ZTE, "Sidelink direct discovery transmission in inter-carrier and inter-PLMN," 3GPP TSG-RAN WG3 #89bis R3-151899, Oct. 9, 2015, Internet<URL:http://www.3gpp.org/ftp/tsg_ran/WG3_Iu/TSGR3_89bis/Docs/R3-151899.

Samsung, "Handling Power Limitation during Inter Carrier Discovery Transmission," 3GPP TSG-RAN WG2 #91 R2-153095, Aug. 28, 2015, Internet<URL:http://www.3gpp.org/ftp/tsg_ran/WG2_RL2/TSGR2_91/Docs/R2-153095.

Qualcomm Incorporated, "Remaining details of D2D and WAN multiplexing," 3GPP TSG-RAN WG1#79 R1-145071, Nov. 21, 2014, Internet<URL:http://www.3gpp.org/ftp/tsg_ran/WG1_RL1/TSGR1_79/Docs/R1-145071.

LG Electronics Inc., "RAN2 impact for discovery on non-PCell," 3GPP TSG-RAN WG2#89bis R2-151678, May 24, 2015, Internet<URL:http://www.3gpp.org/ftp/tsg_ran/WG2_RL2/TSGR2_89bis/Docs/R2-151678.

Samsung, "Capturing RAN2 agreements on eSL (REL-13) in 36.331," 3GPP TSG-RAN WG2#91bis R2-154737, Oct. 9, 2015, Internet<URL:http://www.3gpp.org/ftp/tsg_ran/WG2_RL2/TSGR2_91bis/Docs/R2-154737.

* cited by examiner

USER EQUIPMENT, SERVING BASE STATION, AND METHODS OF USER EQUIPMENT AND SERVING BASE STATION

FIELD

Embodiments of the present disclosure generally relate to wireless communications, and more particularly relates to user equipment, a serving base station and methods therefor.

BACKGROUND

In LTE release 12, Proximity Services (ProSe) direct discovery has been introduced in LTE-A, and the ProSe is also called Device-to-Device (D2D) communication service, wherein user equipment can transmit a D2D discovery signal in a primary cell (i.e., PCell). In LTE release 13, the ProSe direct discovery needs to be enhanced to support discovery transmission in a non-serving cell and/or a secondary cell. The secondary cell may belong to the same or a different Public Land Mobile Network (PLMN) as the serving cell.

According to RAN2#89bis meeting agreement, it is allowed to configure the user equipment via RRC signaling to transmit a D2D discovery signal in another carrier. The RRC signaling can be used to configure either Type 1 or Type 2 discovery configuration for a non-primary cell. However, regarding a problem on how to obtain a discovery transmission resource in a non-primary cell, there is not yet a good solution at present.

Moreover, once user equipment may be configured to transmit a discovery message in a non-primary cell, the user equipment may transmit a discovery signal while a cellular signal is transmitted. In this case, a problem on how to allocate power for the user equipment between cellular transmission and D2D discovery transmission also needs to be solved.

SUMMARY

In view of the foregoing technical problem in the prior art, an objective of the embodiments of the present disclosure is to provide a method of user equipment and a method of a serving base station, as well as corresponding user equipment and a serving base station thereof, to solve the above and other technical problems in the prior art.

According to a first aspect of the present disclosure, there is provided a method of user equipment which may perform cellular transmission via a serving base station. The method may comprise: sending a request message to the serving base station to request allocation of a resource for device-to-device (D2D) discovery transmission; receiving from the serving base station an indication message for indicating the allocated resource; and performing the D2D discovery transmission on the allocated resource while the cellular transmission is performed.

In some embodiments, the method may further comprise: including a frequency for the D2D discovery transmission in the request message, so that the serving base station determines whether the resource is to be allocated by the serving base station or a non-serving base station.

In some embodiment, the method may further comprise: receiving a measurement configuration from the serving base station to perform measurement on the frequency; and sending a measurement report to the serving base station, so that the serving base station determines which non-serving base station is to allocate the resource.

In some embodiments, the method may further comprise: sending the request message to the serving base station only if a cell meeting a predetermined condition and having a signal quality higher than a predetermined threshold is detected on the frequency.

In some embodiments, the method may further comprise: including in the request message an identity of a further Public Land Mobile Network (PLMN) different from a PLMN to which the serving base station belongs, if the user equipment needs to perform the D2D discovery transmission in the further PLMN.

In some embodiments, the method may further comprise: allocating power between the cellular transmission and the D2D discovery transmission according to a predetermined priority rule.

In some embodiments, the predetermined priority rule may comprise: the cellular transmission always having a higher priority than the D2D discovery transmission.

In some embodiments, the predetermined priority rule may comprise: the D2D discovery transmission having a higher priority than the cellular transmission, but having a lower priority than Physical Random Access Channel (PRACH) transmission in a primary cell or a secondary cell, if the D2D discovery transmission is earlier than the cellular transmission in a subframe.

In some embodiments, the predetermined priority rule may comprise: the D2D discovery transmission having a lower priority than the cellular transmission in a primary cell, but having a higher priority than the cellular transmission in a secondary cell, if the D2D discovery transmission is earlier than the cellular transmission in a subframe.

In some embodiments, the predetermined priority rule may comprise: a maximum available transmission power being set for the D2D discovery transmission, and an actual power of the D2D discovery transmission power being not higher than the maximum available transmission power, if the D2D discovery transmission is earlier than the cellular transmission in a subframe.

According to a second aspect of the present disclosure, there is provided a method of a serving base station which serves cellular transmission of user equipment. The method may comprise: receiving from the user equipment a request message for requesting allocation of a resource for device-to-device (D2D) discovery transmission; and sending to the user equipment an indication message for indicating the allocated resource, so that the user equipment performs the D2D discovery transmission on the allocated resource while the cellular transmission is performed.

In some embodiments, the method may further comprise: obtaining from the request message a frequency for the D2D discovery transmission of the user equipment; and determining whether the resource is to be allocated by the serving base station or a non-serving base station based on the obtained frequency.

In some embodiments, the method may further comprise: sending a measurement configuration to the user equipment so that the user equipment performs measurement on the frequency, if it is determined that the resource is to be allocated by a non-serving base station; receiving a measurement report from the user equipment; and determining which non-serving base station is to allocate the resource based on the measurement report.

In some embodiments, the method may further comprise: determining that the resource is to be allocated by a non-serving base station in a further Public Land Mobile Network (PLMN) different from a PLMN to which the serving base station belongs, if the request message includes an identity of the further PLMN. In these embodiments, the method may further comprise: selecting from frequencies of the further PLMN a frequency for the D2D discovery transmission of the user equipment if the request information does not include a frequency on which the user equipment needs to perform D2D discovery transmission; and determining which non-serving base station is to allocate the resource based on the selected frequency.

In some embodiments, the method may further comprise: requesting the determined non-serving base station to allocate the resource; receiving from the non-serving base station a message for indicating the allocated resource; and indicating the allocated resource to the user equipment.

In some embodiments, the method may further comprise: sending the measurement report to the non-serving base station.

In some embodiments, the method may further comprise: in response to receiving the request message from the user equipment, determining whether the user equipment is allowed to perform the D2D discovery transmission while the cellular transmission is performed; and sending the indication message to the user equipment only if the user equipment is allowed to perform the D2D discovery transmission while the cellular transmission is performed.

According to a third aspect of the present disclosure, there is provided user equipment which performs cellular transmission via a serving base station. The user equipment may comprise: a sending unit configured to send a request message to the serving base station to request allocation of a resource for device-to-device (D2D) discovery transmission; a receiving unit configured to receive from the serving base station an indication message for indicating the allocated resource; and a D2D discovery unit configured to perform the D2D discovery transmission on the allocated resource while the cellular transmission is performed.

According to a fourth aspect of the present disclosure, there is provided a serving base station which serves cellular transmission of user equipment. The serving base station may comprise: a receiving unit configured to receive from the user equipment a request message for requesting allocation of a resource for device-to-device (D2D) discovery transmission; and a sending unit configured to send to the user equipment an indication message for indicating the allocated resource, so that the user equipment performs the D2D discovery transmission on the allocated resource while the cellular transmission is performed.

The embodiments of the present disclosure provide a technical solution for the user equipment to obtain a discovery transmission resource in a non-primary cell, and a feasible power allocation mechanism to support discovery transmission in the non-primary cell. The embodiments of the present disclosure realize a resource allocation process in order for the user equipment which supports carrier aggregation or dual connectivity scenarios to perform D2D discovery transmission on a frequency other than a cellular serving frequency. Besides, three different scenarios are considered in power allocation. In the three scenarios, particularly when the D2D discovery transmission is earlier than the cellular transmission in a subframe, several different options are proposed for setting a priority between the cellular transmission and the D2D discovery transmission. With embodiments of the present disclosure, a good D2D discovery performance can be obtained on a frequency of a non-serving cell. Moreover, embodiments of the present disclosure also consider user equipment which does not support the carrier aggregation or dual connectivity scenarios. In this situation, the user equipment may be configured with a scheduling gap for performing discovery in a non-primary cell.

BRIEF DESCRIPTION OF THE DRAWINGS

The above and other objectives, features and advantages of the embodiments of the present disclosure will become more comprehensible through the following detailed description with reference to the accompanying drawings. In the drawings, several embodiments of the present disclosure are illustrated exemplarily, rather than restrictively, wherein.

DETAILED DESCRIPTION

Figure 1:
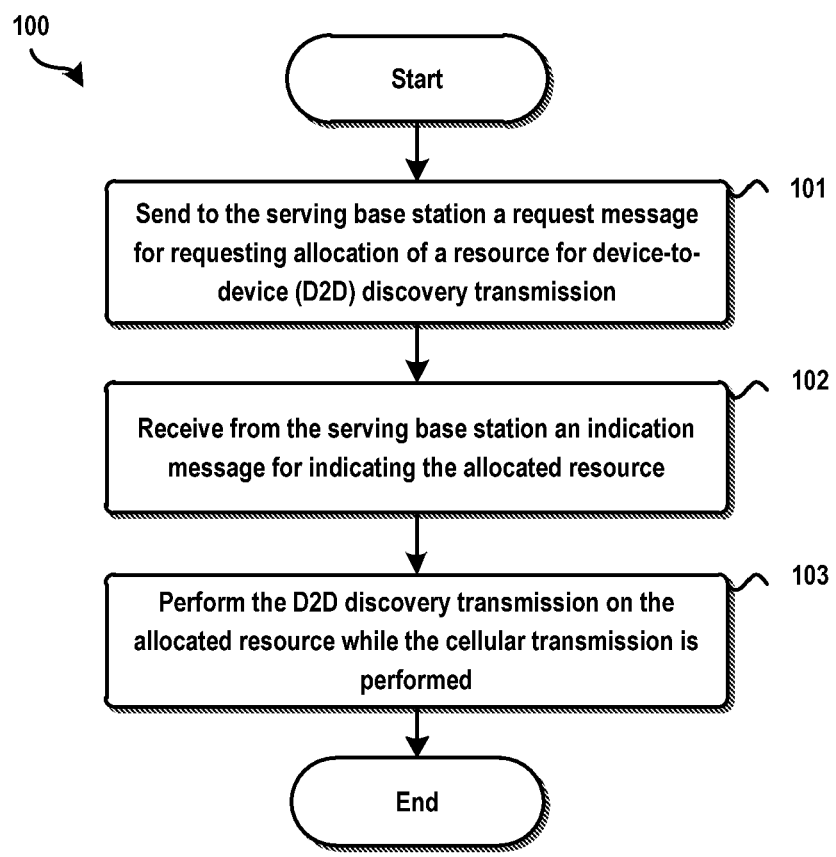
FIG. 1 schematically illustrates a flow chart of a method of user equipment according to embodiments of the present disclosure.

Hereinafter, several exemplary embodiments shown in the drawings will be referenced to describe the principle and spirits of the present disclosure. It should be understood that description of these embodiments is only for enabling those skilled in the art to better understand and implement the present disclosure, rather than limiting the scope of the present disclosure in any manner.

As stated above, one of objectives of the embodiments of the present disclosure is to perform D2D discovery transmission in a non-primary cell in the intra-PLMN or inter-PLMN scenarios, while performing cellular transmission in a primary cell. In order to fulfil this objective, two problems need to be solved. One is how to obtain a discovery transmission resource in a non-primary cell, and another one is how to allocate power when the user equipment needs to simultaneously perform cellular and D2D discovery transmission. As for the two problems, embodiments of the present disclosure provide a method of user equipment and a method of a serving base station, as well as the corresponding user equipment and serving base station, to solve the two problems. Hereinafter, the embodiments of the present disclosure are detailed with reference to the drawings.

FIG. 1 schematically illustrates a flow chart of a method 100 for user equipment according to embodiments of the present disclosure. The method 100 may be performed by user equipment in wireless communication, and the user equipment may perform cellular transmission via a serving base station. Particularly, the method 100 may be performed by the user equipment 600 described hereinafter with reference to FIG. 6.

As shown in FIG. 1, the method 100 may proceed to a step 101 after being started. In the step 101, the user equipment performing the method 100 may send a request message to the serving base station to request allocation of a resource for D2D discovery transmission. It should be appreciated by those skilled in the art that, in certain communication scenarios, the user equipment performing cellular communication through the serving base station may need to perform D2D discovery transmission on a non-serving frequency to allow other user equipment in the neighborhood to discover it, thereby establishing a D2D communication channel between the neighboring user equipment to perform the D2D transmission. However, in such scenario, the user equipment is not assigned with a resource for performing the D2D discovery transmission on another frequency. Accordingly, in order to perform the D2D discovery transmission, the UE may send the request message to the serving base station to request allocation of the resource for the D2D discovery transmission on the frequency.

In some embodiments, the user equipment performing the method 100 may include the frequency for the D2D discovery transmission in the request message, so that the serving base station determines whether the resource is allocated by the serving base station or a non-serving base station. In these embodiments, the user equipment may explicitly indicate, in the request message, the frequency it needs for performing the D2D discovery transmission. After obtaining the frequency from the request message, the serving base station may determine whether a resource on the frequency can be allocated by the serving base station. If the serving base station may allocate the resource on the frequency, it may notify the user equipment the allocated resource. If the serving base station cannot allocate the resource on the frequency, it may request the non-serving base station dominating the frequency resource to allocate the resource.

In some embodiments, the user equipment performing the method 100 may send the request message to the serving base station only if a cell meeting a predetermined condition and having a signal quality higher than a predetermined threshold is detected on this frequency. In these embodiments, before determining a need to perform the D2D discovery transmission on a certain frequency, the user equipment may carry out detection on the frequency. If a cell meeting the predetermined condition and having a signal quality higher than the predetermined threshold is detected, the user equipment sends the request message to the serving base station. As such, it at least prevents the user equipment from blindly sending the request message to the serving base station, thereby saving resources of the system. It may be understood by those skilled in the art that the predetermined condition herein may be determined in advance according to the specific technical environment. For example, the predetermined condition may include but not be limited to those conditions defining a proper cell according to 3GPP TS 36.304.

In some embodiments, if the user equipment performing the method 100 needs to perform the D2D discovery transmission in another PLMN other than the PLMN to which the serving base station belongs, an identity of another PLMN may be included in the request message. In these embodiments, the user equipment needs to perform the D2D discovery transmission on the frequency of another PLMN, which is different from the cellular transmission. In such case, the user equipment may send via the request message to the serving base station the identity of another PLMN to which the frequency for the D2D discovery transmission belongs. The serving base station may, based on the identity in the request message, determine that the resource is to be allocated by a non-serving base station in another PLMN. Moreover, if the user equipment does not indicate the PLMN identity in the request message, the serving base station is to consider that the user equipment needs to perform the D2D transmission within the current PLMN.

Next, the method 100 may proceed to a step 102. In the step 102, the user equipment performing the method 100 may receive from the serving base station an indication message for indicating the allocated resource. It may be appreciated that, after receiving the request message from the served user equipment, the serving base station may correspondingly adopt different manners for allocating the D2D discovery transmission resource to the user equipment depending on different factors in different situations. Thereafter, the serving base station may inform the user equipment of the allocated resource through the indication message.

In some embodiments, the user equipment performing the method 100 may receive a measurement configuration from the serving base station to perform measurement on the frequency, and send a measurement report to the serving base station, so that the serving base station determines which non-serving base station is to allocate the resource. In these embodiments, if the serving base station finds that it cannot allocate the resource on the frequency, it needs to request an non-serving base station to allocate the resource. Hence, the serving base station may send the user equipment the measurement configuration for performing measurement on the frequency. The user equipment may perform measurement on the frequency according to the measurement configuration, and then send a measurement report to the serving base station. Subsequently, based on the measurement report, the serving base station may know which non-serving base station may allocate the resource on the frequency. In these embodiments, the serving base station may know the strongest cell from a result of the measurement by the user equipment in the non-primary cell, and then the serving base station may request the non-serving base station via an X2 interface to allocate to the user equipment the transmission resource for the D2D discovery transmission in the non-primary cell.

Next, the method 100 may proceed to a step 103. In the step 103, the use equipment performing the method 100 may perform the D2D discovery transmission on the allocated resource while the cellular transmission is performed. After finishing the step 103, the method 100 may end.

As discussed above, after solving the first problem on how to obtain the discovery transmission resource in the non-primary cell, there is a need to further solve the second problem on how to allocate power between simultaneous cellular and D2D discovery transmission of the user equipment. The solution of the present disclosure to this problem will be detailed with reference to FIG. 2.

Figure 2:
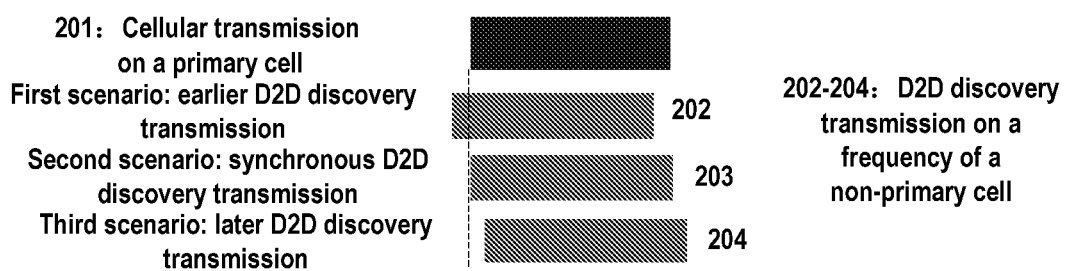
FIG. 2 schematically illustrates scenarios in which different relations are present between cellular transmission and D2D discovery transmission, according to embodiments of the present disclosure.

FIG. 2 schematically illustrates scenarios in which different relations are present between cellular transmission and D2D discovery transmission, according to embodiments of the present disclosure. As shown in FIG. 2, the reference number 201 indicates cellular transmission on the primary cell within a subframe, and the reference numbers 202-204 indicate D2D discovery transmission on a non-primary cell frequency within the same subframe.

According to the chronological relation of the cellular transmission and the D2D discovery transmission within the same subframe, the following three scenarios may be considered during power allocation. A first scenario includes an earlier D2D discovery transmission, i.e., the D2D discovery transmission is earlier than the cellular transmission within the same subframe. A second scenario includes synchronous D2D discovery transmission, i.e., the D2D discovery transmission and the cellular transmission are synchronous within the same subframe. A third scenario includes later D2D discovery transmission, i.e., the D2D discovery transmission is later than the cellular transmission within the same subframe.

For the first scenario, the embodiments of the present disclosure provide several options for setting a priority of power allocation between the D2D discovery transmission and the cellular transmission.

In a first option, the cellular transmission may always have a higher priority than the D2D discovery transmission.

In a second option, the D2D discovery transmission has a higher priority than the cellular transmission, except that the D2D discovery transmission has a lower priority than a Physical Random Access Channel (PRACH) in a primary cell or a secondary cell. This option can be applicable especially for Type 2 discovery, because the transmission resource is allocated by the non-serving base station, and if the user equipment does not utilize this resource, the resource will be wasted.

In a third option, the D2D discovery transmission has a lower priority than the cellular transmission on the primary cell, but has a higher priority than the cellular transmission on the secondary cell, or the D2D discovery transmission has a higher priority than a sounding reference signal (SRS). Usually, the cellular transmission on the primary cell is important to maintain the RRC connection, so it may have a higher priority in power allocation. For the cellular transmission on the secondary cell, it is not very important from a certain perspective. As a result, if the user equipment needs to perform D2D discovery transmission on another frequency, the power allocation for the D2D discovery may have a higher priority than the cellular transmission on the secondary cell.

In a fourth option, a maximum available transmission power may be set for the D2D discovery transmission on the frequency where the user equipment needs to perform the D2D discovery transmission, and an actual power of the D2D discovery transmission is not higher than the maximum available transmission power. When the user equipment does not have a sufficient power for simultaneous cellular transmission and discovery transmission, the D2D discovery transmission can be assigned with the maximum available transmission power, and the cellular transmission can be assigned with the remaining power. This option can promise a good performance for the D2D discovery transmission in the frequency.

For the second and third scenarios, the cellular transmission has a higher priority for the power allocation than the D2D discovery transmission. The user equipment may firstly allocate power for the cellular transmission, and the remaining power may be used for the D2D discovery transmission. This power allocation may cause an insufficient D2D discovery performance because the remaining power may be limited.

Moreover, when the user equipment transmits a cellular signal in the PLMN to which the serving base station belongs and simultaneously transmits a discovery message in another PLMN, the user equipment may consider making the D2D discovery transmission has a higher priority for power allocation than the cellular transmission if it finds that the another PLMN has a higher priority than the PLMN to which the serving base station belongs. With the proposed power allocation mechanism, the embodiments of the present disclosure can support the D2D discovery transmission in the non-primary cell belonging to the scenario of intra-PLMN or the scenario of inter-PLMN.

Therefore, in some embodiments, corresponding to different options of the different scenarios, the user equipment performing the method 100 can allocate power between the cellular transmission and the D2D discovery transmission according to a predetermined priority rule. In various embodiments, the predetermined rule may include the following: the cellular transmission may always have a higher priority than the D2D discovery transmission; the D2D discover transmission may have a higher priority than the cellular transmission, but have a lower priority than the PRACH transmission on the primary cell or the secondary cell, if the D2D discovery transmission is earlier than the cellular transmission in a subframe; the D2D discovery transmission may have a lower priority than the cellular transmission on the primary cell, but have a higher priority than the cellular transmission on the secondary cell, if the D2D discovery transmission is earlier than the cellular transmission in a subframe; and a maximum available transmission power may be set for the D2D discovery transmission and an actual power of the D2D discovery transmission is not higher than the maximum available power transmission, if the D2D discovery transmission is earlier than the cellular transmission in a subframe.

Figure 3:
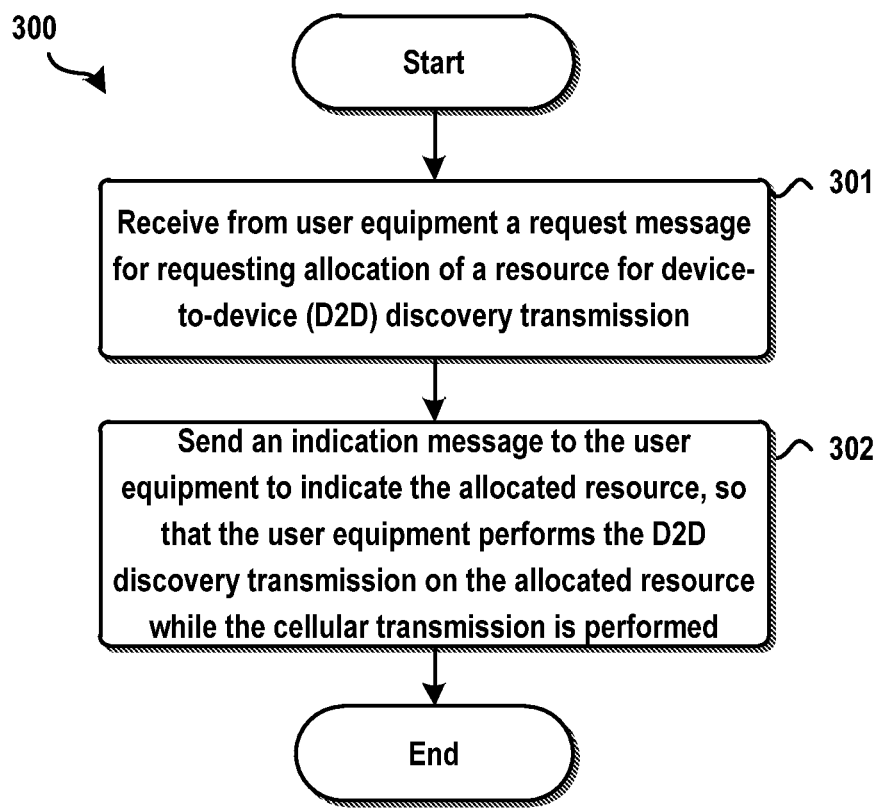
FIG. 3 schematically illustrates a flow chart of a method of a serving base station according to embodiments of the present disclosure.

FIG. 3 schematically illustrates a flow chart of a method 300 for a serving base station according to embodiments of the present disclosure. The method 300 may be performed by a serving base station in wireless communication, and the serving base station may serve cellular transmission of user equipment. Particularly, the method 300 may be performed by the serving base station 700 described hereinafter with reference to FIG. 7.

As shown in FIG. 3, the method 300 may proceed to a step 301 after being started. In the step 301, the serving base station performing the method 300 may receive from the user equipment a request message for requesting allocation of a resource for D2D discovery transmission. It may be appreciated by those skilled in the art that, if the user equipment served by the serving cell needs to perform the D2D discovery transmission in a non-serving cell, it needs to request the serving base station to allocate the resource for performing the D2D discovery transmission.

In some embodiments, the serving base station performing the method 300 may obtain from the request message a frequency for the D2D discovery transmission of the user equipment, and determine, based on the obtained frequency, whether the resource is allocated by the serving base station or a non-serving base station. In these embodiments, the user equipment may explicitly inform, in the request message, the serving base station of the frequency where it needs to perform the D2D discovery transmission. After obtaining the frequency from the request message, the serving base station may determine whether the resource on the frequency may be allocated by the serving base station. If the serving base station can allocate the resource on the frequency, it may inform the user equipment of the allocated resource. If the serving base station cannot allocate the resource on the frequency, it may request the non-serving base station dominating the frequency resource to allocate this resource. In these embodiments, the serving base station may know the strongest cell from a result of measurement by the user equipment in the non-primary cell, and then the serving base station may request the non-serving base station through an X2 interface to allocate the transmission resource to the user equipment for the D2D discovery transmission in the non-primary cell.

In some embodiments, if it is determined that the resource is to be allocated by a non-serving base station, the serving base station performing the method 300 may send a measurement configuration to the user equipment to enable the user equipment to perform measurement on the frequency; then, the serving base station performing the method 300 may receive a measurement report from the user equipment and determine which non-serving base station is to allocate the resource based on the measurement report. In these embodiments, if the serving base station finds that it cannot allocate the resource on the frequency, there is a need to request a non-serving base station to allocate the resource. Hence, the serving base station may transmit to the user equipment the measurement configuration for performing measurement on the frequency. The user equipment may perform measurement on the frequency according to the measurement configuration and then send the measurement report to the serving base station. Thereafter, the serving base station may know which non-serving base station can allocate the resource on the frequency, based on the measurement report.

In some embodiments, if the request message includes an identity of another PLMN different than the PLMN to which the serving base station belongs, the serving base station performing the method 300 may determine that the resource is to be allocated by a non-serving base station in another PLMN. In these embodiments, the user equipment needs to perform the D2D discovery transmission on a frequency of the PLMN different from that of the cellular transmission. In this case, the user equipment may send via the request message to the serving base station the identity of another PLMN to which the frequency where the D2D discovery transmission needs to be performed belongs. The serving base station may determine that the resource is to be allocated by a non-serving base station in another PLMN based on the identity in the request message. Further, if the user equipment does not indicate a PLMN identity in the request message, the serving base station is to consider that the user equipment needs to perform the D2D discovery transmission within the current PLMN.

In further embodiments of the above embodiments, if the request message does not include a frequency on which the user equipment needs to perform the D2D discovery transmission, the serving base station performing the method 300 may select, from the frequencies of another PLMN, a frequency for the D2D discovery transmission of the user equipment, and determine, based on the selected frequency, which non-serving base station is to allocate the resource. In these embodiments, the request message includes an identity of another PLMN but fails to indicate the frequency on which the D2D discovery transmission needs to be performed. In this case, the serving base station may autonomously select from a frequency range of another PLMN a frequency for the D2D discovery transmission of the user equipment, and then request a particular base station in the another PLMN to allocate the resource according to the selected frequency.

In some embodiments, the serving base station performing the method 300 may request the determined non-serving base station to allocate the resource, receive a message indicating the allocated resource from the non-serving base station, and indicate the allocated resource to the user equipment. In these embodiments, after determining which non-serving base station is to be requested to allocate the resource, the serving base station requests the non-serving base station to allocate the resource, then receives an indication on the allocated resource from the non-serving base station, and thereafter notify the user equipment of the allocated resource. In some embodiments, the serving base station may request the non-serving base station through an X2 interface to allocate a transmission resource for the user equipment to be used in the D2D discovery transmission in the non-primary cell.

In some embodiments, the serving base station performing the method 300 may send the measurement report to the non-serving base station. In these embodiments, after the non-serving base station receives the measurement report on the frequency where the user equipment needs to perform the D2D discovery transmission, it is advantageous for the specific operations for allocating the resource on the frequency.

Next, the method 300 may proceed to a step 302. In the step 302, the serving base station performing the method 300 may send to the user equipment an indication message for indicating the allocated resource, so that the user equipment performs the D2D discovery transmission on the allocated resource while the cellular transmission is performed.

In some embodiments, the serving base station performing the method 300 may, in response to receiving the request message from the user equipment, determine whether the user equipment is allowed to the D2D discovery transmission while the cellular transmission is performed; and send the indication message to the user equipment only if the user equipment is allowed to perform the D2D discovery transmission while the cellular transmission is performed. In these embodiments, the serving base station may control whether the user equipment is to perform the D2D discovery transmission while the cellular transmission is performed. In certain cases, for example, when there is a need to ensure the cellular transmission unaffected, the serving base station may determine that the user equipment is not allowed to perform the D2D discovery transmission while the cellular transmission is performed.

After the step 302 is finished, the method 300 may end.

Figure 4:
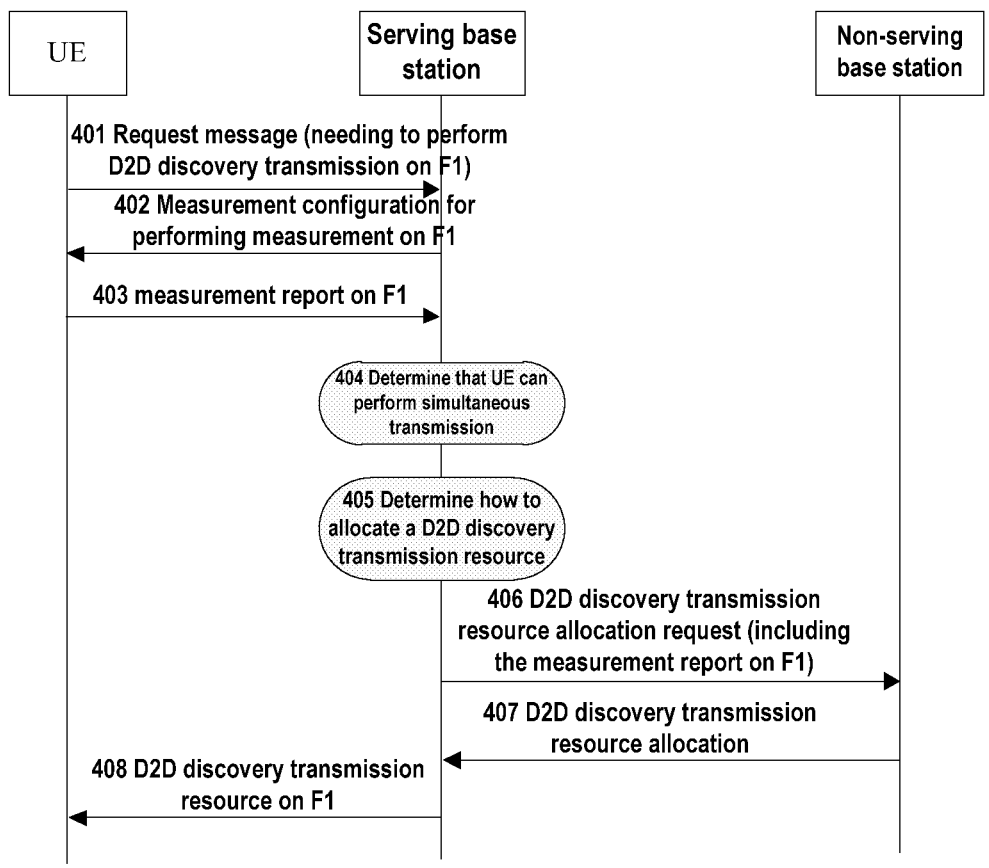
FIG. 4 schematically illustrates a signaling interaction process of allocating a D2D discovery transmission resource according to one embodiment of the present disclosure.

FIG. 4 schematically illustrates a signaling interaction process of allocating a D2D discovery transmission resource according to one embodiment of the present disclosure. By way of example, FIG. 4 shows a signaling interaction process among the user equipment, the serving base station and the non-serving base station in order to transmit a D2D discovery signal while a cellular signal is transmitted within the scenario of the same PLMN. It may be appreciated by those skilled in the art that the signaling interaction process as depicted in FIG. 4 is only a specific example of the embodiments of the present disclosure, and the scope of the present disclosure is not limited by the depicted details.

In this specific example, the user equipment may have an uplink carrier aggregating or dual connectivity capability to support simultaneous cellular transmission and D2D discovery transmission within different cells, and the user equipment has accessed to the primary cell and established a RRC connection to perform the service. If the user equipment has a high throughput requirement, the serving base station may configure a secondary cell or secondary cells for the user equipment.

Now, the user equipment needs to send a D2D discovery message in a non-primary cell, and it may send a request message to the serving base station to request assignment of the transmission resource on a particular frequency F1. The request message may be a SidelinkUEInformation message. After receiving the request message, the serving base station may check whether the user equipment can perform the D2D discovery transmission while the cellular service is performed, and then determine how to deal with the request message. In the embodiment in FIG. 4, the serving base station determines that the user equipment can simultaneously support the D2D discovery transmission on the frequency F1 and the cellular transmission (TX/RX) on the primary cell, and allows the user equipment to perform the two transmissions simultaneously. The serving base station may configure a transmission resource for the user equipment in the frequency F1, so that the user equipment can perform the D2D discovery transmission while the cellular transmission is performed. However, if the serving base station does not have a right to allocate the D2D discovery transmission resource in the frequency F1, the serving base station needs to request other non-serving base stations to allocate the resource of the D2D discovery transmission for the user equipment in the frequency F1. Further, the user equipment may perform measurement in the frequency F1 and obtain a measurement report in the frequency F1, so that the serving base station may determine that the user equipment is in coverage of which cell. Next, the non-serving base station in charge of the cell coverage range may allocate the resource of the D2D discovery transmission for the user equipment. In the following specific process, an autonomous resource selection or scheduled resource allocation of the user equipment may be applied.

In a step 401, the user equipment may send a request message to the serving base station to request allocation of the D2D discovery transmission resource in the frequency F1. In a step 402, the serving base station may configure the user equipment to perform measurement in the frequency F1. In a step 403, the user equipment may send to the serving base station a measurement report of the measurement performed in the frequency F1. In this measurement report, the user equipment may indicate the RSRP/RSRQ of which cell is the strongest. In a step 404, the serving base station may determine whether the simultaneous cellular and D2D discovery transmission are employed, in order to allow the current cellular service to be maintained. In the specific example of FIG. 4, the serving base station determines that the user equipment can support the simultaneous transmission (i.e., the cellular transmission on the primary cell and the D2D discovery transmission in the frequency F1), and the serving base station may determine that the user equipment performs the simultaneous transmission. In a step 405, the serving base station may determine how to allocate the D2D discovery transmission resource for the user equipment in the frequency F1. In the specific example of FIG. 4, it is assumed that a non-serving base station is in charge of allocating the D2D discovery resource in the frequency F1 (the strongest cell in the frequency F1 as reported by the user equipment belongs to the non-serving base station, and the strongest cell indicates a cell having the highest RSRP measurement result as reported by the user equipment). If the serving base station can allocate the D2D discovery transmission resource in the frequency F1, it may directly indicate the resource allocation to the user equipment. In a step 406, the serving base station may send to the non-serving base station a request for the D2D discovery transmission resource allocation for the user equipment in the frequency F1. In a step 407, the non-serving base station may allocate the resource for the D2D discovery transmission to the user equipment in the frequency F1. In a step 408, the serving base station may send to the user equipment an indication of the D2D discovery transmission resource in the frequency F1.

After receiving the D2D discovery transmission resource in the frequency F1, the user equipment may transmit the D2D discovery message in the frequency F1. Because the user equipment needs to transmit a discovery signal while a cellular signal is transmitted, power allocation is required between the cellular transmission and the D2D discovery transmission. Such power allocating process may be similar to the power allocating solution as detailed above with reference to FIG. 2.

Figure 5:
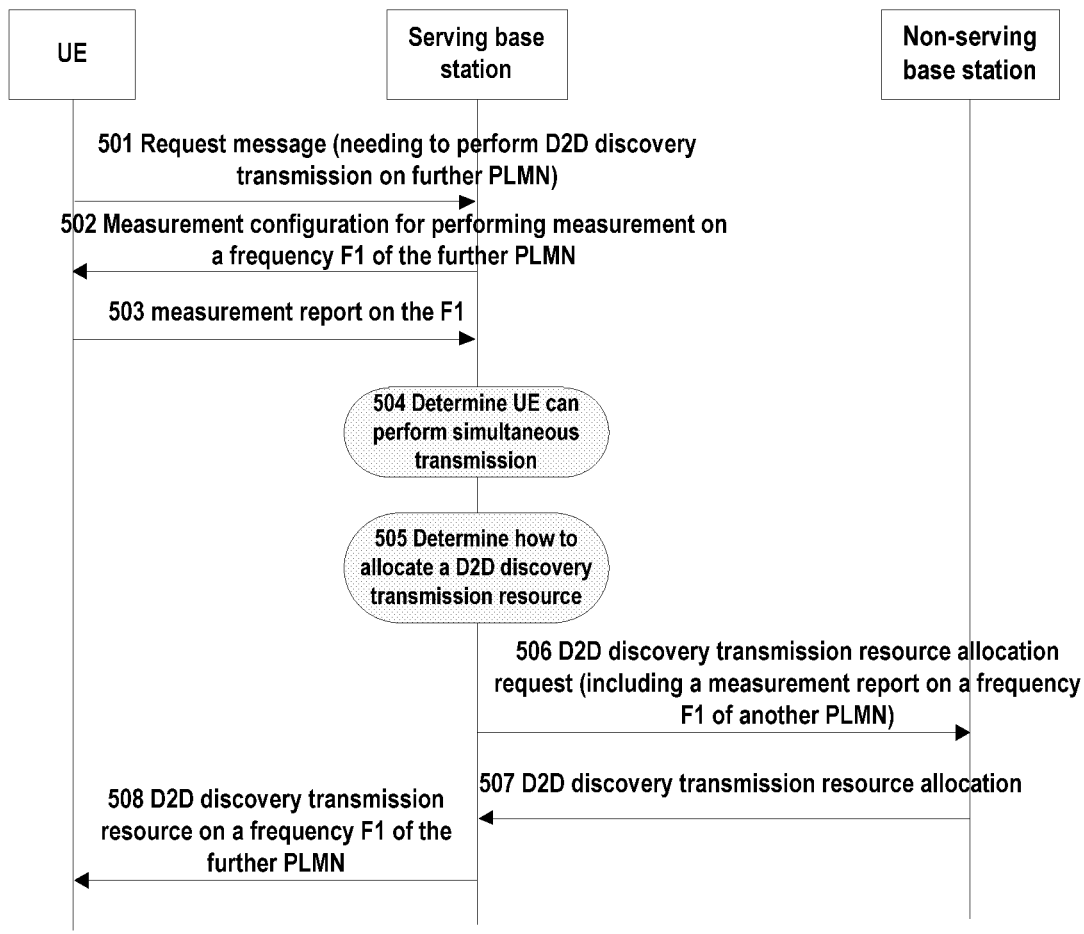
FIG. 5 schematically illustrates a signaling interaction process of allocating a D2D discovery transmission resource according to another embodiment of the present disclosure.

FIG. 5 schematically illustrates a signaling interaction process of allocating a D2D discovery transmission resource according to another embodiment of the present disclosure. By way of example, FIG. 5 illustrates a signaling interaction process among the user equipment, the serving base station and the non-serving base station in order to perform the D2D discovery signal transmission in another PLMN different from the PLMN where the serving base station is located. It may be appreciated by those skilled in the art that the signaling interaction process depicted in FIG. 5 is only a specific example of embodiments of the present disclosure, and the scope of the present disclosure is not limited by the details as described above.

In this specific example, the user equipment is allowed to transmit a D2D discovery message in a non-primary cell of another PLMN. Here, it is assumed that the user equipment is authorized to transmit a discovery message in the non-primary cell of another PLMN. In this aspect, the D2D functions may provide the authorization information to the user equipment to indicate all the PLMNs in which the user equipment is allowed to transmit the D2D discovery signal. In the specific example of FIG. 5, the user equipment has accessed to the primary cell and established a RRC connection to perform service, and the current PLMN of the primary cell is PLMN1.

Now, the user equipment needs to transmit a D2D discovery message in a non-primary cell of another PLMN (e.g. PLMN2), and it may send a request message which may be a SidelinkUEInformation message to the serving base station to request allocation of the resource for the D2D discovery transmission. The specific operation process will be described in detail as below.

In a step 501, the user equipment may send a request message to the serving base station to request allocation of the D2D discovery transmission resource on another PLMN. In this aspect, the current SidelinkUEInformation may not support requesting allocation of the D2D discovery transmission resource on another PLMN, but the message can be enhanced in the embodiments of the present disclosure in this regard. Moreover, a new information element may be added to the request message (e.g. SidelinkUEInformation) to indicate an identity of another PLMN, so that the serving base station may know that the user equipment needs to perform the D2D discovery transmission on another PLMN. In the specific example of FIG. 5, the user equipment indicates PLMN2 in the request message. If the user equipment does not indicate a PLMN identity in the request message, the serving base station may consider that the user equipment needs to transmit the D2D discovery message in the current PLMN (i.e., the PLMN1).

Besides, the user equipment may indicate the frequency on which the D2D discovery transmission needs to be performed in the request message, or may not indicate the frequency in the request message. If the user equipment does not indicate the frequency in the request message, the serving base station may determine which frequency of the PLMN2 is suitable for the user equipment to transmit the D2D discovery message.

Subsequently, steps 502 to 505 may be similar to the corresponding steps in the operation process depicted with reference to FIG. 4. In a step 506, the serving base station may send to the non-serving base station a request on allocation of the D2D discovery transmission resource for the user equipment in frequency F1 of PLMN2. After receiving the resource for the D2D discovery transmission in the frequency F1, the user equipment may transmit the D2D discovery message in the frequency F1.

Because the user equipment needs to transmit a D2D discovery signal while a cellular signal is transmitted, power allocation is required to be performed between the cellular transmission and the D2D discovery transmission. In this aspect, the power allocation solution as described with respect to FIG. 2 may be used, or a new option may be introduced to deal with the simultaneous cellular and D2D discovery transmission in different PLMNs. In the PLMN selection, a non-access (NAS) layer of the user equipment needs to indicate a priority of each PLMN to an access (AS) layer of the user equipment, so the user equipment knows the priority order between the PLMN1 and the PLMN2. In the specific example of FIG. 5, it is assumed that PLMN2 has a higher priority than the PLMN1. Under this situation, the user equipment may consider that the D2D discovery transmission on the PLMN2 has a higher priority than the cellular transmission on the PLMN1. Therefore, when the user equipment has no enough power for simultaneous cellular and D2D discovery transmission, the D2D discovery transmission may be firstly assigned with power, and the cellular transmission can be assigned with the remaining power.

Figure 6:
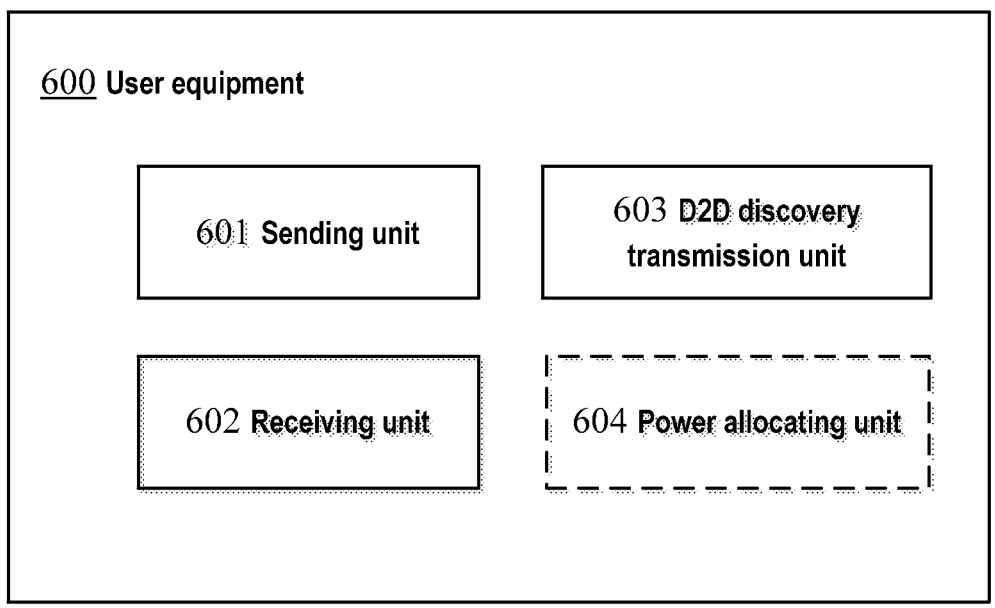
FIG. 6 schematically illustrates a block diagram of the user equipment according to embodiments of the present disclosure.

FIG. 6 schematically illustrates a block diagram of user equipment 600 according to embodiments of the present disclosure. In the block diagram of FIG. 6, a dashed block is used to represent an optional unit or component. As shown in FIG. 6, the user equipment 600 may include a sending unit 601, a receiving unit 602 and a D2D discovery transmission unit 603. It may be appreciated by those skilled in the art that FIG. 6 only shows units or components of the user equipment 600 closely related with the embodiments of the present disclosure, and in the practice the user equipment may include other functional units or components enabling its normal function.

In some embodiments, the sending unit 601 may be configured to send a request message to a serving base station to request allocation of a resource for D2D discovery transmission. The receiving unit 602 may be configured to receive from the serving base station an indication message for indicating the allocated resource. The D2D discovery transmission unit 603 may be configured to perform D2D discovery transmission on the allocated resource while the cellular transmission is performed.

In some embodiments, the sending unit 601 may be further configured to include a frequency for the D2D discovery transmission in the request message, so that the serving base station determines whether the resource is to be allocated by the serving base station or a non-serving base station.

In some embodiments, the receiving unit 602 may be configured to receive a measurement configuration from the serving base station to perform measurement on the frequency; and the sending unit 601 may be further configured to send a measurement report to the serving base station, so that the serving base station determines which non-serving base station is to allocate the resource.

In some embodiments, the sending unit 601 may be configured to send the request message to the serving base station only if a cell meeting a predetermined condition and having a signal quality higher than a predetermined threshold is detected on the frequency.

In some embodiments, the sending unit 601 may be configured, if the user equipment needs to perform the D2D discovery transmission in a further PLMN different from the PLMN to which the serving base station belongs, to include an identity of the further PLMN in the request message.

In some embodiments, the user equipment 600 may further include a power allocating unit 604. The power allocating unit 604 may be configured to allocate power between the cellular transmission and the D2D discovery transmission according to a predetermined priority rule.

In some embodiments, the predetermined priority rule may include: the cellular transmission always having a higher priority than the D2D discovery transmission; the D2D discovery transmission having a higher priority than the cellular transmission, but having a lower priority than PRACH transmission in a primary cell or a secondary cell, if the D2D discovery transmission is earlier than the cellular transmission in a subframe; the D2D discovery transmission having a lower priority than the cellular transmission on the primary cell, but having a higher priority than the cellular transmission on the secondary cell, if the D2D discovery transmission is earlier than the cellular transmission in a subframe; a maximum available transmission power being set for the D2D discovery transmission and an actual power of the D2D discovery transmission being not higher than the maximum available transmission power, if the D2D discovery transmission is earlier than the cellular transmission in a subframe.

Figure 7:
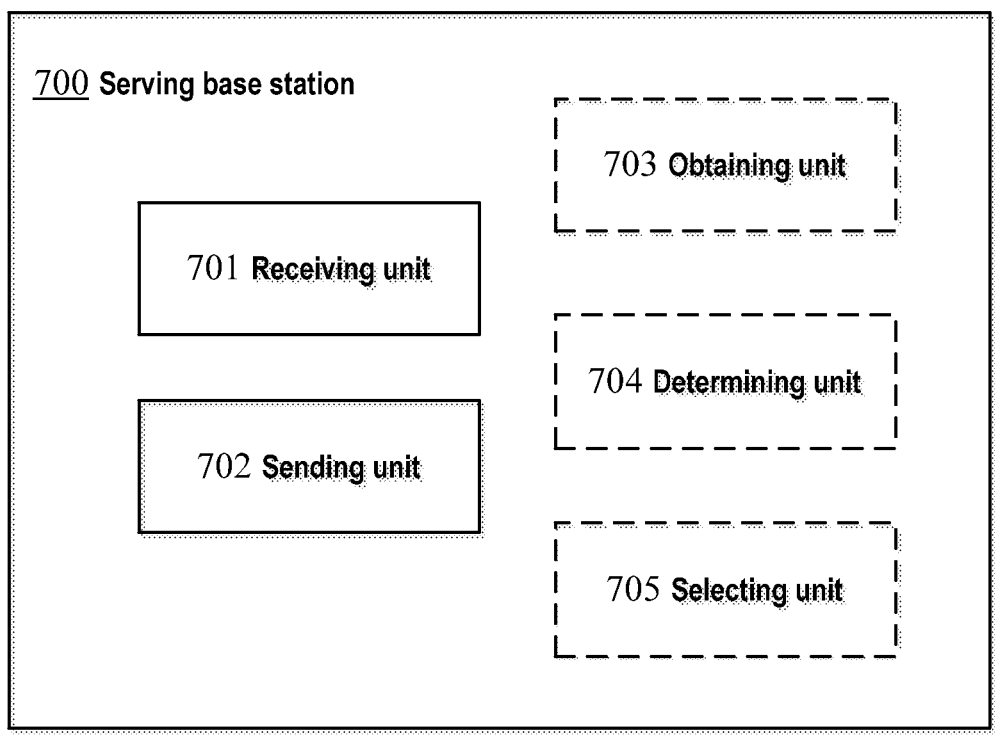
FIG. 7 schematically illustrates a block diagram of the serving base station according to embodiments of the present disclosure.

FIG. 7 schematically illustrates a block diagram of a serving base station 700 according to embodiments of the present disclosure. In the block diagram of FIG. 7, a dashed block is used to represent an optional unit or component. As shown in FIG. 7, the serving base station 700 may include a receiving unit 701 and a sending unit 702. It may be appreciated by those skilled in the art that FIG. 7 only shows units or components in the serving base station 700, which are closely related with the embodiments of the present disclosure, and in the practice the serving base station 700 may include other functional units or components enabling its normal operation.

In some embodiments, the receiving unit 701 may be configured to receive from the user request a request message for requesting allocation of resource for D2D discovery transmission. The sending unit 702 may be configured to send to the user equipment an indication message for indicating the allocated resource, so that the user equipment performs the D2D discovery transmission on the allocated resource while the cellular transmission is performed.

In some embodiments, the serving base station 700 may further include an obtaining unit 703. The obtaining unit 703 may be configured to obtain from the request message a frequency for the D2D discovery transmission of the user equipment. In some embodiments, the serving base station 700 may also include a determining unit 704. The determining unit 704 may be configured to determine whether the resource is to be allocated by the serving base station or a non-serving base station based on the obtained frequency.

In some embodiments, the sending unit 702 may be further configured to send a measurement configuration to the user equipment so that the user equipment performs measurement on the frequency if the determining unit 704 determines that the resource is to be allocated by a non-serving base station. The receiving unit 701 may be further configured to receive a measurement report from the user equipment. The determining unit 704 may be further configured to determine which non-serving base station is to allocate the resource based on the measurement report.

In some embodiments, the determining unit 704 may be further configured, if the request message includes an identity of a further PLMN different from a PLMN to which the serving base station belongs, to determine that the resource is to be allocated by a non-serving base station in the further PLMN.

In these embodiments, the serving base station 700 may further include a selecting unit 705. The selecting unit 705 may be configured to select from frequencies of the further PLMN a frequency for the D2D discovery transmission of the user equipment if the request message does not include a frequency on which the user equipment needs to perform the D2D discovery transmission. The determining unit 704 may be further configured to determine which non-serving base station allocates the resource based on the selected frequency.

In some embodiments, the sending unit 702 may be further configured to request the determined non-serving base station to allocate the resource. The receiving unit 701 may be further configured to receive from the non-serving base station a message for indicating the allocated resource. The sending unit 702 may be further configured to indicate the allocated resource to the user equipment.

In some embodiments, the sending unit 702 may be further configured to send the measurement report to the non-serving base station.

In some embodiments, the determining unit 704 may be further configured to in response to receiving request message from the user equipment, determine whether the user equipment is allowed to perform the D2D discovery transmission while the cellular transmission is performed. The sending unit 702 may be further configured to send an indication message to the user equipment only if the user equipment is allowed to perform the D2D discovery transmission while the cellular transmission is performed.

In the description of the embodiments of the present disclosure, the term "comprise" or similar expressions should be interpreted as conveying an open meaning, i.e., "comprise but are not limited to". The term "based on" should be interpreted as "at least partly based on". The term "one embodiment" or "the embodiment" should be interpreted as "at least one embodiment".

It should be noted that the embodiments of the present disclosure may be implemented through hardware, software, or combination of software and hardware. The hardware part may be realized using a dedicated logic; the software part may be stored in a memory, and may be implemented by a suitable instruction implementing system, for example, a microprocessor or dedicated design hardware. Those skilled in the art may understand that the aforementioned apparatus and method may be realized using computer executable instructions and/or being included in processor controlling code, and for example, such code is provided on the programmable memory or a data carrier such as an optical or electronic signal carrier.

Besides, although the operations of the method of the present disclosure are depicted in a particular sequence in the figures, this does not require or hint that such operations should be completed in a particular sequence as shown, or all shown operations should be executed so as to achieve a desired result. In contrast, the sequence of the steps depicted in the flow chart may be changed. Additionally or alternatively, some steps may be omitted, and multiple steps may be combined as one step to be implemented, and/or one step may be divided into multiple steps to be implemented. It should also be noted that two or more features and functions of the apparatus according to the present disclosure may be embodied in one apparatus. On the contrary, one feature and function of the apparatus depicted above may be further implemented by multiple apparatus.

Though the present disclosure is described with reference to several embodiments, it should be understood that the present disclosure is not limited to the disclosed embodiments. The present disclosure intends to cover all modifications and equivalent arrangements within the spirits and scope of the appended claims.

We claim:

1. A method for wireless communications by a user equipment, the user equipment operable to perform a cellular transmission towards a serving base station, comprising:
    generating a request message including a frequency for a device-to-device (D2D) discovery transmission;
    sending the request message towards the serving base station for requesting allocation of a resource for the D2D discovery transmission, so to enable the serving base station to determine whether the resource is to be allocated by the serving base station or a non-serving base station;
    receiving from the serving base station an indication message for indicating the allocated resource; and
    performing the D2D discovery transmission on the allocated resource while simultaneously the cellular transmission towards the serving base station is performed.

2. The method according to claim 1, further comprising:
    receiving a measurement configuration from the serving base station to perform measurement on the frequency; and
    sending a measurement report to the serving base station, so that the serving base station determines which non-serving base station is to allocate the resource.

3. The method according to claim 1, further comprising:
    allocating power between the cellular transmission and the D2D discovery transmission according to a predetermined priority rule.

4. The method according to claim 3, wherein the predetermined priority rule comprises:
    the cellular transmission always having a higher priority than the D2D discovery transmission.

5. The method according to claim 3, wherein the predetermined priority rule comprises:
    the D2D discovery transmission having a higher priority than the cellular transmission, but having a lower priority than Physical Random Access Channel (PRACH) transmission in a primary cell or a secondary cell, if the D2D discovery transmission is earlier than the cellular transmission in a subframe.

6. The method according to claim 3, wherein the predetermined priority rule comprises:
    the D2D discovery transmission having a lower priority than the cellular transmission in a primary cell, but having a higher priority than the cellular transmission in a secondary cell, if the D2D discovery transmission is earlier than the cellular transmission in a subframe.

7. The method according to claim 3, wherein the predetermined priority rule comprises:
    a maximum available transmission power being set for the D2D discovery transmission and an actual power of the D2D discovery transmission power being not higher than the maximum available transmission power, if the D2D discovery transmission is earlier than the cellular transmission in a subframe.

8. A method for wireless communications by a serving base station, the serving base station operable to perform a cellular transmission towards user equipment, comprising:
receiving from the user equipment a request message for requesting allocation of a resource for a device-to-device (D2D) discovery transmission;
obtaining from the request message a frequency for the D2D discovery transmission of the user equipment;
determining whether the resource is to be allocated by the serving base station or a non-serving base station based on the obtained frequency; and
sending to the user equipment an indication message for indicating the allocated resource, so as to enable the user equipment to perform the D2D discovery transmission on the allocated resource while simultaneously the cellular transmission towards the serving base station is performed.

9. The method according to claim 8, further comprising:
sending a measurement configuration to the user equipment so that the user equipment performs measurement on the frequency, if it is determined that the resource is to be allocated by a non-serving base station;
receiving a measurement report from the user equipment; and
determining which non-serving base station is to allocate the resource based on the measurement report.

10. The method according to claim 8, further comprising:
determining that the resource is to be allocated by a non-serving base station in a further Public Land Mobile Network (PLMN) different from a PLMN to which the serving base station belongs, if the request message includes an identity of the further PLMN.

11. The method according to claim 10, further comprising:
selecting from frequencies of the further PLMN a frequency for the D2D discovery transmission of the user equipment, if the request message does not include a frequency on which the user equipment needs to perform the D2D discovery transmission; and
determining which non-serving base station is to allocate the resource based on the selected frequency.

12. User equipment, operable to perform a cellular transmission towards a serving base station, comprising:
at least one processor; and
at least one memory including computer executable instructions;
the computer executable instructions configured to, with the at least one processor, cause the user equipment to at least perform:
generating a request message including a frequency for a device-to-device (D2D) discovery transmission;
sending the request message towards the serving base station for requesting allocation of a resource for the D2D discovery transmission, so as to enable the serving base station to determine whether the resource is to be allocated by the serving base station or a non-serving base station;
receiving from the serving base station an indication message for indicating the allocated resource; and
performing the D2D discovery transmission on the allocated resource while simultaneously the cellular transmission towards the serving base station is performed.

13. A serving base station, operable to perform cellular transmission towards a user equipment, comprising:
at least one processor; and
at least one memory including computer executable instructions;
the computer executable instructions configured to, with the at least one processor, cause the serving base station to at least perform:
receiving from the user equipment a request message for requesting allocation of a resource for a device-to-device (D2D) discovery transmission;
obtaining from the request message a frequency for the D2D discovery transmission of the user equipment;
determining whether the resource is to be allocated by the serving base station or a non-serving base station based on the obtained frequency;
sending to the user equipment an indication message for indicating the allocated resource, so as to enable the user equipment to perform the D2D discovery transmission on the allocated resource while simultaneously the cellular transmission towards the serving base station is performed.

* * * * *